United States Patent
Schubert et al.

(10) Patent No.: US 8,163,265 B2
(45) Date of Patent: Apr. 24, 2012

(54) MECHANICALLY STABLE CATALYST BASED ON ALPHA-ALUMINA

(75) Inventors: Olga Schubert, Ludwigshafen (DE); Martin Sesing, Waldsee (DE); Lothar Seidemann, Mannheim (DE); Martin Karches, Neustadt (DE); Thomas Grassler, Limburgerhof (DE); Martin Sohn, Lohra (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 12/888,082

(22) Filed: Sep. 22, 2010

(65) Prior Publication Data

US 2011/0014114 A1    Jan. 20, 2011

Related U.S. Application Data

(62) Division of application No. 12/064,725, filed as application No. PCT/EP2006/065559 on Aug. 22, 2006, now Pat. No. 7,910,517.

(30) Foreign Application Priority Data

Aug. 25, 2005   (DE) .......................... 10 2005 040 286

(51) Int. Cl.
*C01B 7/00* (2006.01)
*B01J 23/00* (2006.01)
*B01J 21/00* (2006.01)

(52) U.S. Cl. ........ 423/502; 502/302; 502/330; 502/331; 502/332; 502/341; 502/344; 502/346; 502/355; 502/415; 502/439

(58) Field of Classification Search .................. 502/302, 502/330, 331, 332, 341, 344, 346, 355, 415, 502/439; 423/502
See application file for complete search history.

(56) References Cited

U.S. PATENT DOCUMENTS

| | | | |
|---|---|---|---|
| 2,854,404 A | 9/1958 | Weisz et al. | |
| 4,274,981 A | 6/1981 | Suzuki et al. | |
| 4,528,279 A | 7/1985 | Suzuki et al. | |
| 4,771,029 A | 9/1988 | Pereira et al. | |
| 4,873,217 A | 10/1989 | Kawajiri et al. | |
| 4,910,180 A | 3/1990 | Berndt et al. | |
| 4,956,169 A * | 9/1990 | Ajioka et al. | 423/502 |
| 5,034,209 A * | 7/1991 | Ajioka et al. | 423/502 |
| 5,491,120 A | 2/1996 | Voss et al. | |
| 5,536,694 A | 7/1996 | Schuetz et al. | |
| 5,639,436 A * | 6/1997 | Benson et al. | 423/502 |
| 5,798,314 A | 8/1998 | Spencer et al. | |
| 5,871,707 A * | 2/1999 | Hibi et al. | 423/502 |
| 5,908,607 A * | 6/1999 | Abekawa et al. | 423/502 |
| 5,935,896 A | 8/1999 | Dupuis et al. | |
| 5,935,898 A | 8/1999 | Trubenbach et al. | |
| 6,022,823 A | 2/2000 | Augustine et al. | |
| 6,071,488 A * | 6/2000 | Minet | 423/502 |
| 6,197,275 B1 * | 3/2001 | Hagemeyer et al. | 423/502 |
| 6,255,249 B1 | 7/2001 | Voss et al. | |
| 6,284,703 B1 | 9/2001 | Ostgard et al. | |
| 6,329,315 B1 | 12/2001 | Denton et al. | |
| 6,337,300 B1 | 1/2002 | Sauer et al. | |
| 6,686,312 B1 | 2/2004 | Aramata et al. | |
| 6,713,035 B1 * | 3/2004 | Iwanaga et al. | 423/502 |
| 6,921,738 B2 | 7/2005 | Hwang et al. | |
| 6,977,066 B1 * | 12/2005 | Iwanaga et al. | 423/502 |
| 2002/0039549 A1 | 4/2002 | Lindner et al. | |
| 2002/0132730 A1 | 9/2002 | Hwang et al. | |
| 2002/0172640 A1 | 11/2002 | Hibi et al. | |
| 2004/0072686 A1 | 4/2004 | Sauer et al. | |

FOREIGN PATENT DOCUMENTS

| | | |
|---|---|---|
| CA | 2 558 547 | 10/2005 |
| EP | 0 743 277 | 11/1996 |
| EP | 0 936 184 | 8/1999 |
| EP | 1 170 250 | 1/2002 |
| GB | 1046313 | 10/1966 |
| JP | 2005179104 | 7/2005 |
| WO | WO 01/10550 | 2/2001 |
| WO | WO 2005/097715 | 10/2005 |

* cited by examiner

*Primary Examiner* — Cam N Nguyen
(74) *Attorney, Agent, or Firm* — Oblon, Spivak, McClelland, Maier & Neustadt, L.L.P.

(57) ABSTRACT

An oxidation process employing a mechanically stable catalyst of an active metal or combination of active metals supported on aluminum oxide, which is predominantly alpha-aluminum oxide, is provided. The active metal or metals is optionally one or a mixture of ruthenium, copper, gold, an alkaline earth metal, an alkali metal, palladium, platinum, osmium, iridium, silver, and rhenium. The process is applicable to the oxidation of hydrogen chloride to chlorine in a Deacon process.

20 Claims, No Drawings

MECHANICALLY STABLE CATALYST BASED ON ALPHA-ALUMINA

CROSS-REFERENCE TO RELATED APPLICATIONS

This application is a divisional application of U.S. application Ser. No. 12/064,725, filed on Feb. 25, 2008, which has issued as U.S. Pat. No. 7,910,517. This application claims priority to U.S. application Ser. No. 12/064,725, filed Feb. 25, 2008, to International Application No. PCT/EP2006/065559, filed on Aug. 22, 2006, and to German Application No. 10 2005 040 286.0, filed on Aug. 25, 2005, all of which are incorporated herein by reference in their entireties.

The invention relates to a mechanically stable catalyst based on alpha-aluminum oxide as support. The invention further relates to such a catalyst for the catalytic oxidation of hydrogen chloride by means of oxygen to give chlorine and also a process for the catalytic oxidation of hydrogen chloride using the catalyst.

In the process for the catalytic oxidation of hydrogen chloride developed by Deacon in 1868, hydrogen chloride is oxidized by means of oxygen to give chlorine in an exothermic equilibrium reaction. The conversion of hydrogen chloride into chlorine enables chlorine production to be decoupled from sodium hydroxide production by chloralkali electrolysis. Such decoupling is attractive since the worldwide demand for chlorine is growing more strongly than the demand for sodium hydroxide. In addition, hydrogen chloride is obtained in large amounts as coproduct in, for example, phosgenation reactions, for instance in isocyanate production.

EP-A 0 743 277 discloses a process for preparing chlorine by catalytic oxidation of hydrogen chloride, in which a ruthenium-comprising supported catalyst is used. Here, ruthenium is applied in the form of ruthenium chloride, ruthenium oxychlorides, chlororuthenate complexes, ruthenium hydroxide, ruthenium-amine complexes or in the form of further ruthenium complexes to the support. The catalyst can comprise palladium, copper, chromium, vanadium, manganese, alkali metals, alkaline earth metals and rare earth metals as further metals.

According to GB 1,046,313, ruthenium(III) chloride on aluminum oxide is used as catalyst in a process for the catalytic oxidation of hydrogen chloride.

Gamma-aluminum oxide is usually used as aluminum oxide support.

A disadvantage of the known processes which employ catalysts based on gamma-aluminum oxide is the low mechanical strength of the catalysts. This decreases further during use of the catalyst in the reactor. The low mechanical strength of the catalysts results in high attrition. Attrition and fine dust formation can lead to overloading of cyclones and filters or filter chambers in a fluidized-bed process.

It is an object of the present invention to improve the mechanical strength of aluminum oxide supports. A further object is to provide catalysts having an increased mechanical strength or gas-phase reactions, in particular for the catalytic oxidation of hydrogen chloride.

This object is achieved by a catalyst for gas-phase reactions which has high mechanical stability and comprises one or more active metals on a support comprising aluminum oxide as support material, wherein the aluminum oxide in the support consists essentially of alpha-aluminum oxide.

It has surprisingly been found that in a support comprising gamma-aluminum oxide, a phase transformation of gamma-aluminum oxide into alpha-aluminum oxide occurs in places even at comparatively low temperatures as occur, for example, in the gas-phase oxidation of hydrogen chloride to chlorine (380-400° C.). The domains of crystalline alpha-aluminum oxide formed in this way significantly reduce the strength of the shaped catalyst body, which is also reflected in the significantly increased attrition values of the used catalyst.

The support used according to the invention can comprise alpha-aluminum oxide in admixture with further support materials. Suitable further support materials are, for example, graphite, silicon dioxide, titanium dioxide and zirconium dioxide, preferably titanium dioxide and zirconium dioxide, for example in amounts of up to 50% by weight. The support preferably consists essentially of aluminum oxide, for example to an extent of 90% by weight and above, and it particularly preferably comprises at least 96% by weight of aluminum oxide. The aluminum oxide in the support consists essentially of alpha-aluminum oxide, preferably at least 90% by weight, particularly preferably at least 98% by weight, of alpha-aluminum oxide, based on the total aluminum oxide in the support. The phase composition of the support can be determined by XRD (X-ray diffraction).

In general, the catalyst of the invention is used for carrying out gas-phase reactions at a temperature above 200° C., preferably above 320° C., particularly preferably above 350° C. However, the reaction temperature is generally not more than 600° C., preferably not more than 500° C.

The catalyst of the invention can comprise any active metals and also further metals as promoters. The catalyst usually comprises active metals and further promoter metals in amounts of up to 10% by weight, based on the weight of the catalyst.

If the catalyst of the invention is to be used in the catalytic oxidation of hydrogen chloride (Deacon process), the active metals are selected from among the elements of groups 7-11 of the Periodic Table of the Elements.

Particularly preferred active metals are ruthenium, copper and/or gold.

The supported copper or ruthenium catalysts can be obtained, for example, by impregnation of the support material with aqueous solutions of $CuCl_2$ or $RuCl_3$ and, if appropriate, a promoter for doping, preferably in the form of their chlorides. The shaping of the catalyst can be carried out after or preferably before impregnation of the support material.

Gold-comprising catalysts according to the invention can be obtained by application of gold in the form of the aqueous solution of a soluble gold compound and subsequent drying or drying and calcination. Gold is preferably applied as an aqueous solution of $AuCl_3$ or $HAuCl_4$ to the support.

The ruthenium-, copper- and/or gold-comprising catalysts of the invention for the catalytic oxidation of hydrogen chloride can additionally comprise compounds of one or more other noble metals selected from among palladium, platinum, osmium, iridium, silver and rhenium. The catalysts can also be doped with one or more further metals. Suitable promoters for doping are alkali metals such as lithium, sodium, potassium, rubidium and cesium, preferably lithium, sodium and potassium, particularly preferably potassium, alkaline earth metals such as magnesium, calcium, strontium and barium, preferably magnesium and calcium, particularly preferably magnesium, rare earth metals such as scandium, yttrium, lanthanum, cerium, praseodymium and neodymium, preferably scandium, yttrium, lanthanum and cerium, particularly preferably lanthanum and cerium, or mixtures thereof, also titanium, manganese, molybdenum and tin.

Preferred catalysts according to the invention for the oxidation of hydrogen chloride comprise a) from 0.001 to 10% by weight, preferably from 1 to 3% by weight, of ruthenium, copper and/or gold,
b) from 0 to 5% by weight, preferably from 0 to 3% by weight, of one or more alkaline earth metals,
c) from 0 to 5% by weight, preferably from 0 to 3% by weight, of one or more alkali metals,
d) from 0 to 10% by weight, preferably from 0 to 3% by weight, of one or more rare earth metals,
e) from 0 to 10% by weight, preferably from 0 to 1% by weight, of one or more further metals selected from the group consisting of palladium, platinum, osmium, iridium, silver and rhenium, in each case based on the total weight of the catalyst. The weights indicated are based on the weight of the metal, even though the metals are generally present in oxidic form on the support.

Ruthenium is very particularly preferred as active metal and is generally comprised in amounts of from 0.001 to 10% by weight, based on the weight of the catalyst. In a specific embodiment, the catalyst of the invention comprises about 1-3% by weight, for example about 1.6% by weight, of ruthenium on alpha-aluminum oxide as support and no further active metals and promoter metals, with ruthenium being present as $RuO_2$.

The catalysts of the invention are obtained by impregnation of the support material with aqueous solutions of salts of the metals. The metals apart from gold are usually applied as aqueous solutions of their chlorides, oxychlorides or oxides to the support. Shaping of the catalyst can be carried out after or preferably before impregnation of the support material. The catalysts of the invention are also used as fluidized-bed catalysts in the form of powder having a mean particle size of 10-200 μm. As fixed-bed catalysts, they are generally used in the form of shaped catalyst bodies.

The shaped bodies or powders can subsequently be dried at temperatures of from 100 to 400° C., preferably from 100 to 300° C., for example under a nitrogen, argon or air atmosphere and, if appropriate, calcined. The shaped bodies or powders are preferably firstly dried at from 100 to 150° C. and subsequently calcined at from 200 to 400° C. The oxides, for example $RuO_2$ or CuO, are performed from the chlorides during calcination.

The invention also provides a process for producing catalysts by impregnating alpha-aluminum oxide as support with one or more metal salt solutions comprising the active metal or metals and, if appropriate, one or more promoter metals, and drying and calcining the impregnated support. Shaping to produce shaped catalyst particles can be carried out before or after impregnation. The catalyst of the invention can also be used in powder form.

Suitable shaped catalyst bodies include all shapes, with preference being given to pellets, rings, cylinders, stars, wagon wheels or spheres, particularly preferably rings, cylinders or star extrudates. The specific surface area of the alpha-aluminum oxide support prior to metal salt deposition is generally in the range from 0.1 to 10 $m^2/g$.

Alpha-aluminum oxide can be prepared by heating gamma-aluminum oxide to temperatures above 1000° C.; it is preferably prepared in this way. In general it is calcined for 2-24 hours.

The present invention also provides a process for the catalytic oxidation of hydrogen chloride by means of oxygen to give chlorine over the catalyst of the invention.

For this purpose, a stream of hydrogen chloride and an oxygen-comprising stream are fed into an oxidation zone and hydrogen chloride is partially oxidized in the presence of the catalyst to give chlorine, so that a product gas stream comprising chlorine, unreacted oxygen, unreacted hydrogen chloride and water vapor is obtained. The hydrogen chloride steam, which can originate from a plant for the preparation of isocyanates, can comprise impurities such as phosgene and carbon monoxide.

The reaction temperatures are usually in the range from 150 to 500° C., and the reaction pressures are usually in the range from 1 to 25 bar, for example 4 bar. The reaction temperature is preferably >300° C., particularly preferably from 350° C. to 400° C. Furthermore, it is advantageous to use oxygen in superstoichiometric amounts. For example, 1.5- to four-fold oxygen excess is usual. Since no losses of selectivity have to be feared, it can be economically advantageous to carry out the reaction at relatively high pressures and accordingly at residence times which are longer than under atmospheric pressure.

Usual reaction apparatuses in which the catalytic oxidation according to the invention of hydrogen chloride is carried out are fixed-bed or fluidized-bed reactors. The oxidation of hydrogen chloride can be carried out in one or more stages.

The catalyst bed or fluidized catalyst bed can comprise further suitable catalysts or additional inert material in addition to the catalyst of the invention.

The catalytic oxidation of hydrogen chloride can be carried out adiabatically or preferably isothermally or approximately isothermally, batchwise or preferably continuously as a moving-bed or fixed-bed process, preferably as fixed-bed process, particularly preferably in shell-and-tube reactors, at reactor temperatures of from 200 to 500° C., preferably from 300 to 400° C., and a pressure of from 1 to 25 bar, preferably from 1 to 5 bar.

In isothermal or approximately isothermal operation, it is also possible to use a plurality of reactors, for example from 2 to 10 reactors, preferably from 2 to 6 reactors, particularly preferably from 2 to 5 reactors, in particular 2 or 3 reactors, connected in series with additional intermediate cooling. The oxygen can either all be added together with the hydrogen chloride upstream of the first reactor or distributed over the various reactors. This series arrangement of individual reactors can also be combined in one apparatus.

In one embodiment of the fixed-bed process, a structured catalyst bed in which the catalyst activity increases in the direction of flow is used. Such structuring of the catalyst bed can be achieved by different impregnation of the catalyst support with active composition or by different dilution of the catalyst bed with an inert material. Inert materials which can be used are, for example, rings, cylinders or spheres comprising titanium dioxide, zirconium dioxide or mixtures thereof, aluminum oxide, steatite, ceramic, glass, graphite or stainless steel. The inert material preferably has similar external dimensions to the shaped catalyst bodies.

The conversion of hydrogen chloride in a single pass can be limited to from 15 to 90%, preferably from 40 to 85%. Unreacted hydrogen chloride can, after having been separated off, be recirculated in part or in its entirety to the catalytic oxidation of hydrogen chloride. The volume ratio of hydrogen chloride to oxygen at the reactor inlet is generally from 1:1 to 20:1, preferably from 1.5:1 to 8:1, particularly preferably from 1.5:1 to 5:1.

The chlorine formed can subsequently be separated off in a customary manner from the product gas stream obtained in the catalytic oxidation of hydrogen chloride. The separation usually comprises a plurality of stages, namely isolation and, if appropriate, recirculation of unreacted hydrogen chloride from the product gas stream from the catalytic oxidation of hydrogen chloride, drying of the resulting residual gas stream which consists essentially of chlorine and oxygen and separation of chlorine from the dried stream.

The invention is illustrated by the following examples.

EXAMPLES

Determination of Attrition and Proportion of Fines by the Montecatini Method The attrition test simulates the mechanical stresses to which a fluidized material (e.g. a catalyst) is subjected in a fluidized gas/solid bed and gives as results an attrition value (AT) and a proportion of fines (PF) which describe the strength behavior.

The attrition apparatus comprises a nozzle plate (nozzle diameter=0.5 mm) which is connected in a gastight and solids-tight manner to a glass tube. A steel tube having a conical widening is fixed above the glass tube, likewise in a gastight and solids-tight manner. The apparatus is connected to the 4 bar compressed air supply. A reducing valve decreases the pressure to 2 bar absolute upstream of the apparatus.

60.0 g of catalyst are introduced into the apparatus. The amount of compressed air for carrying out the experiment is 350 L/h. The apparatus itself is operated under atmospheric conditions (1 bar, 20° C.). Owing to the high gas velocity at the nozzle, the particles are subjected to abrasion or broken up by particle/particle and particle/wall impacts. The solid discharged travels via a tube bend into a filter paper thimble (pore size: 10-15 μm) and the purified gas flows into the exhaust air system of the laboratory.

The solid which has been deposited is weighed after one hour (defined as the proportion of fines PF) and after 5 hours (defined as the attrition AT).

Example 1

A pulverulent gamma-aluminum oxide support from Sasol (Puralox® SCCa 30/170) was firstly converted into alpha-$Al_2O_3$. The support consists of particles having a mean particle diameter of about 50 μm. For this purpose, 2000 g of Puralox® SCCa 30/170 were heated at 1200-1300° C. for 5 hours. 1500 g of the support obtained were impregnated with an aqueous $RuCl_3$ hydrate solution (55.56 g of $RuCl_3$ hydrate corresponding to 41.8% by weight of Ru in 480 g of water). The water uptake of the support was about 0.38 mL/g. After impregnation to 90% of the water uptake, the impregnated support was dried at 120° C. for 6 hours and subsequently calcined at 350° C. for 2 hours. The catalyst produced in this way comprises about 2% of $RuO_2$ on alpha-$Al_2O_3$. The most important properties of the catalyst are summarized in Table 1.

Comparative Example C1

The gamma-aluminum oxide support Puralox® SCCa 30/170 was used directly for producing the catalyst without prior heat treatment. About 1434 g of the support were impregnated with an aqueous $RuCl_3$ hydrate solution (54.1 g of $RuCl_3$ hydrate corresponding to 36.5% of Ru in 1045 g of water). The water uptake of the support was about 0.81 mL/g. The support which had been impregnated to 90% of the water uptake was dried at 120° C. for 6 hours and calcined at 350° C. for 2 hours. The catalyst produced in this way comprises about 2% of $RuO_2$ on gamma-$Al_2O_3$. The most important properties of the catalyst are summarized in Table 1.

TABLE 1

| Example | $RuO_2$ content [% by weight] | BET surface area [m$^2$/g] | Attrition by the Montecatini method [g/60 g] | Proportion of fines by the Montecatini method [g/60 g] | Phase composition determined by XRD |
|---|---|---|---|---|---|
| 1 | 1.98 | 4 | 3.6 | 1.4 | alpha-$Al_2O_3$ |
| C1 | 2.10 | 163 | 8.4 | 2.8 | gamma-$Al_2O_3$ |

Example 2 and Comparative Example 2

A Deacon reactor was operated in the fluidized-bed mode using the catalysts from Example 1 and Comparative Example C1. The Deacon reactor consisted of a tube having a diameter of 4 cm and a length of 1 m and comprised 600 g of the catalyst. At 380-400° C. and a reactor pressure of 4 bar, 200 standard L/h of HCl and 100 standard L/h of $O_2$ were fed into the reactor; the HCl conversion was 60-80%. After operation of the reactor for 1000 hours, the catalyst was removed. The catalyst properties of the used catalyst are summarized in Table 2.

TABLE 2

| Example | RuO$_2$ content [% by weight] | BET surface area [m$^2$/g] | Attrition by the Montecatini method [g/60 g] | Proportion of fines by the Montecatini method [g/60 g] | Phase composition determined by XRD |
| --- | --- | --- | --- | --- | --- |
| 1 | 2.0 | 2.8 | 3.8 | 1.2 | alpha-Al$_2$O$_3$ |
| C1 | 1.9 | 120 | 20.5 | 16 | gamma-Al$_2$O$_3$ + alpha-Al$_2$O$_3$ |

As can clearly be seen from the values for proportion of fines and attrition, the catalyst according to the invention has a significantly higher mechanical stability compared to the corresponding catalyst on gamma-aluminum oxide as support. This is the case even for the freshly produced catalyst, but in particular for the used catalyst.

The invention claimed is:

1. A process for the catalytic oxidation of hydrogen chloride, comprising oxidizing the hydrogen chloride with oxygen over a fluidized catalyst bed comprising catalyst particles of a catalyst;
   wherein the catalyst is a fluidized bed catalyst for gas-phase reactions which has high mechanical stability in the form of powder having a mean particle size of from 10 to 200 μm and comprises one or more active metals on a support consisting essentially of aluminum oxide as support material, wherein the aluminum oxide in the support consists essentially of alpha-aluminum oxide.

2. The process of claim 1, wherein the one or more active metals is/are selected from among the elements of groups 7-11 of the Periodic Table of the Elements.

3. The process of claim 2, wherein the catalytic oxidation is carried out at a reaction temperature of >350° C.

4. The process of claim 1, wherein the one or more active metals comprises ruthenium, copper and/or gold.

5. The process of claim 4, wherein the catalytic oxidation is carried out at a reaction temperature of >350° C.

6. The process of claim 1, wherein the catalyst comprises
   a) from 0.001 to 10% by weight of ruthenium, copper, and/or gold,
   b) from 0 to 5% by weight of one or more alkaline earth metals,
   c) from 0 to 5% by weight of one or more alkali metals,
   d) from 0 to 10% by weight of one or more rare earth metals,
   e) from 0 to 10% by weight of one or more further metals selected from the group consisting of palladium, platinum, osmium, iridium, silver and rhenium,
   in each case based on the total weight of the catalyst.

7. The process of claim 6, wherein the catalytic oxidation is carried out at a reaction temperature of >350° C.

8. The process of claim 1, wherein the active metal is ruthenium.

9. The process of claim 1, wherein the active metal comprises ruthenium.

10. The process of claim 1, wherein the active metal comprises copper.

11. The process of claim 1, wherein the active metal is copper.

12. The process of claim 1, wherein the active metal comprises gold.

13. The process of claim 1, wherein the active metal is gold.

14. The process of claim 1, wherein the aluminum oxide in the support consists of alpha-aluminum oxide.

15. The process of claim 1, wherein the support consists of aluminum oxide.

16. The process of claim 1, wherein the catalyst is doped with at least one metal selected from the group consisting of potassium, magnesium, lanthanum, and cerium.

17. The process of claim 16, wherein the catalyst is doped with potassium.

18. The process of claim 16, wherein the catalyst is doped with magnesium.

19. The process of claim 16, wherein the catalyst is doped with lanthanum.

20. The process of claim 1, wherein the catalytic oxidation is carried out at a reaction temperature of >350° C.

* * * * *